(12) United States Patent
Fogliani et al.

(10) Patent No.: US 8,516,855 B2
(45) Date of Patent: Aug. 27, 2013

(54) METHOD FOR PRODUCING AN OPTICAL FIBER PREFORM

(75) Inventors: Sabrina Fogliani, Segrate (IT); Carlo Tregambe, Brescia (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 788 days.

(21) Appl. No.: 10/475,750

(22) PCT Filed: Apr. 16, 2002

(86) PCT No.: PCT/EP02/04201
§ 371 (c)(1),
(2), (4) Date: Jun. 10, 2004

(87) PCT Pub. No.: WO02/090276
PCT Pub. Date: Nov. 14, 2002

(65) Prior Publication Data
US 2004/0237595 A1      Dec. 2, 2004

Related U.S. Application Data

(60) Provisional application No. 60/288,833, filed on May 7, 2001.

(30) Foreign Application Priority Data
Apr. 27, 2001   (EP) .................................. 01110475

(51) Int. Cl.
*C03B 37/027*   (2006.01)
(52) U.S. Cl.
USPC .............................................. 65/377; 65/421

(58) Field of Classification Search
USPC .................................................... 65/377, 421
See application file for complete search history.

(56) References Cited

U.S. PATENT DOCUMENTS

| 4,627,867 A | 12/1986 | Tanaka et al. |
| 4,731,103 A | 3/1988 | Mizutani et al. |
| 4,810,276 A * | 3/1989 | Gilliland ........................ 65/421 |

(Continued)

FOREIGN PATENT DOCUMENTS

| EP | 0 665 191 A1 | 8/1995 |
| EP | 0 976 690 A2 | 2/2000 |
| EP | 0978491 A2 | 2/2000 |
| JP | 4-367536 | 12/1992 |
| JP | 2000-119035 | 4/2000 |
| JP | 2000-272930 | 10/2000 |

OTHER PUBLICATIONS

Yukio, K. "Production of Parent Material for Optical Fiber", Patent Abstracts of Japan, JP63025243, (Feb. 2, 1988).

(Continued)

*Primary Examiner* — John Hoffmann
(74) *Attorney, Agent, or Firm* — Finnegan, Henderson, Farabow, Garrett & Dunner, L.L.P.

(57) ABSTRACT

A method for producing an optical fiber preform. Glass soot particles are formed by jetting and combusting a gaseous glass-forming material and a fuel gas from a burner in the presence of oxygen. The glass soot particles are deposited on a deposition rod while rotating the deposition rod about its axis and reciprocating the burner in parallel to the deposition rod so as to form the preform and varying at least one of the translation velocity of the burner and the rotation velocity of the rod so as to obtain a predetermined radial soot density distribution in the preform.

5 Claims, 2 Drawing Sheets

(56) References Cited

U.S. PATENT DOCUMENTS

| | | | |
|---|---|---|---|
| 5,152,818 A * | 10/1992 | Berkey et al. | 65/412 |
| 5,296,012 A * | 3/1994 | Antos et al. | 65/390 |
| 5,599,371 A * | 2/1997 | Cain et al. | 65/413 |
| 6,047,564 A | 4/2000 | Schaper et al. | |
| 6,050,108 A | 4/2000 | Ishihara et al. | |
| 6,306,500 B1 * | 10/2001 | Kuwabara et al. | 428/372 |

OTHER PUBLICATIONS

Futoshi, M. "Production of Porous Base Material for Optical Fiber", Patent Abstracts of Japan, JP63079731, (Apr. 9, 1988).

Takeyuki, K. "Manufacture of Optical Fiber Preform", Patent Abstracts of Japan, JP60264338, (Dec. 27, 1985).

* cited by examiner

METHOD FOR PRODUCING AN OPTICAL FIBER PREFORM

CROSS REFERENCE TO RELATED APPLICATIONS

This application is a national phase application based on PCT/EP02/04201, filed Apr. 16, 2002, the content of which is incorporated herein by reference, and claims the priority of European Patent Application No. 01110475.9, filed Apr. 27, 2001, the content of which is incorporated herein by reference, and claims the benefit of U.S. Provisional Application No. 60/288,833, filed May 7, 2001, the content of which is incorporated herein by reference.

BACKGROUND OF THE INVENTION

1. Field of the Invention

The present invention relates to a method for producing an optical fiber preform.

2. Description of the Related Art

Optical fibers, largely used in optical telecommunications, are typically made by fusing and drawing an optical fiber glass preform. There are known different techniques to produce an optical glass preform, the main being outside vapor deposition (OVD), modified chemical vapor deposition (MCVD), vapor axial deposition (VAD), and plasma-enhanced chemical vapor deposition (PECVD).

Each of the above techniques conventionally involves: i) delivery of a vapor flow containing glass forming precursors to an oxidation site such as, for example, the flame of a gas/oxygen burner or hot plasma zone adjacent to a deposition substrate or inside a deposition tube; ii) oxidation of the vapor flow to form a particulate or soot oxidation product; and, iii) collection of the particulate or soot oxidation product on the substrate or tube to form a preform (in the PECVD process, the glass is deposited directly from the vapor phase onto the tube without the intermediate soot formation step). While in the MCVD and PECVD processes the resulting soot preform is generally clear after the deposition stage and can be drawn into fiber without a sintering step, in the OVD and VAD methods the resulting soot preform is further processed, by sintering, to form clear glass from which an optical waveguide fiber is drawn. Dopants may be included in the vapor flow to modify various characteristics of the resulting glass such as refractive index or coefficient of thennal expansion.

Silica ($SiO_2$)-based optical fibers have long been commercially preferred for optical telecommunications. By providing a preform with a radially varying refractive index profile, an optical fiber with the requisite waveguiding characteristics can be drawn. In order to provide the appropriate waveguiding characteristics, $SiO_2$ has been doped with various compounds to alter Its refractive Index. These compounds include, for example. $GeO_2$, $TiO_2$, $Al_2O_3$ and $P_2O_5$. Vapors containing these compounds are conventionally provided using metal halides such as $GeCl_4$, $TiCl_4$, and $POCl_3$. It Is also known that certain compounds, such as rare earth elements, can be incorporated into the glass structure to provide other optical-functions including lasing and signal amplification.

In a conventional OVD process, silica soot is deposited on successive layers onto a central bar, usually named "core"or "mandrel". For purposes hereof, a layer is defined as that portion of glass soot that is deposited by one pass of the burner along the mandrel. Silica is generated in the above-mentioned oxidation of the vapor flow. Deposition is typically performed by reciprocating the burner in parallel to the mandrel, while the mandrel rotates about its axis. This deposition process is typically performed twice: the first time to produce an intermediate preform (whose material will give rise to the core and to an internal part of the cladding of the fiber) on a removable mandrel, and the second time (in the so called "overcladding step") for depositing a cladding soot (which will give rise to an external part of the cladding of the fiber) on a mandrel obtained by stretching and cutting the intermediate preform. The overcladding step provides the majority of the material that will constitute the optical fiber and then it requires much more time than the first deposition step. At the end of the two deposition steps, a final preform is obtained, which is successively consolidated and drawn into an optical fiber.

Soot density during the deposition process is an important parameter to achieve a final glass preform of good quality. The deposition density is related to the temperature of the substrate on which the soot is deposited, the higher being the temperature the higher being the density.

Several documents deal with density of a soot preform in a chemical deposition process.

U.S. Pat. No. 6,050,108, in the name of Sumitomo Electric Industries, although dealing with a VAD process and, in particular, to the stages of degassing and consolidating the preform, states that the porous glass preform should preferably have a bulk density not less than 0.6 $g/cm^3$, more preferably from about 0.6 $g/cm^3$ to about 0.8 $g/cm^3$. If the bulk density falls below this range, the porous glass preform tends to be broken because it is too soft. On the other hand, if the bulk density exceeds the above range, the glass preform has too much high hardness and therefore, air bubbles already Incorporated therein are hardly removed and tend to remain.

U.S. Pat. No. 4,810,276 in the name of Coming Glass Works describes an OVD process for making an optical fiber preform, wherein the first layer of cladding soot is deposited on a core glass bait rod at a density of at least 0.5 $g/cm^3$ {preferably in the range of about 0.6 $g/cm^3$ to 0.7 $g/cm^3$}, while the remainders of the layers are deposited at the same density or at a density gradually decreasing from the density of the first pass as radius increases. According to U.S. Pat. No. 4,810,276, depositing the soot on the bait rod at a density less than about 0.5 $g/cm^3$ determines a bond of the soot particles to the core surface that is not strong enough to force conformity of the core to the soot coating as the coating shrinks longitudinally during consolidation. To obtain the said soot density in the first layer, the rod is preheated by a burner and an auxiliary burner immediately prior to soot deposition.

The Applicant observes that the solution of pre-heating the bait rod proposed in U.S. Pat. No. 4,810,276 allows only controlling the density in the first layer, while there is no suggestion on how to control the soot density in the following layers. Moreover, an auxiliary burner is required for preheating the bait rod.

U.S. Pat. No. 4,627,867, in the name of Sumitomo Electric Industries, faces the problems of soot rod cracking or lowering of deposition yield when the temperature of the soot rod during deposition is respectively too low or too high, and proposes to deposit fine glass particles by means of a first burner at such a temperature that a soot rod at a low bulk density is formed, and subsequently heat the soot rod by a second burner so as to increase the bulk density of the soot. The soot rod is then sintered to obtain a transparent glass preform for an optical fiber. In a preferred embodiment, firstly the soot rod having the low specific bulk density of from 0.02 to 0.1 $g/cm^3$ is formed and then the bulk density is increased to from 0.15 to 0.5 $g/cm^3$.

As previously, a second burner is required, which adds complexity and cost to the system. Moreover, this technique leads to an increase in the gas consumption.

U.S. Pat. No. 4,731,103, in the name of Sumitomo Electric Industries, describes a method for producing a glass preform for an optical fiber by the OVD method, by which a glass preform having desired distribution of bulk density and not suffering from cracking or the fluctuation of the additive concentration In its radial direction is produced. This method comprises measuring the temperature of a part of the soot rod on which the glass particles are deposited and controlling said temperature by adjusting the fuel gas-jetting rate. The soot rod is then sintered to obtain a transparent glass preform.

A similar technique is proposed by JP 04367536 A2, in the name of Fujikura. This patent relates to a method for manufacturing a rare earth-added quartz and faces the problem of non-uniform impregnation of a soot body dipped in a rare earth metal alcohol chloride solution, when the soot body has a bulk density in the center section higher than in the surface section. This problem is solved by producing a soot body by an OVD method, in which the deposition of the soot is performed while the surface temperature of the outer circumferential surface of the soot body to be deposited on a rod-shaped starting parent material is kept constant and, more particularly, by providing a soot body with an average bulk density of 0.3 to 0.7 $g/cm^3$ and a bulk density change in the radial direction within ±0.5%. For this purpose, an infrared thermometer is used to measure the surface temperature of the soot body, and a flow controller controls the flow of hydrogen and oxygen supplied to the burner in accordance with a temperature signal from the thermometer. The described process also comprises the withdrawal of the burner in the perpendicular direction with respect to the parent starter material, in accordance with the extent of growth of the body of the soot, in such a way that the surface temperature of the outer circumferential surface of the soot body is maintained at a constant.

SUMMARY OF THE INVENTION

According to the Applicant, the variation of the flame temperature by modifying the flow of fuel gas is relatively cumbersome. As a matter of fact, the flow rate of each single gas from the burner shall be modified and optimized to achieve a suitable reaction environment for obtaining an acceptable deposition rate.

The Applicant has faced the problem of providing a technique for controlling the soot density during an OVD deposition process, which prevents the risks of soot cracking or cleavage and of bubbles generation, and which guarantees a good control of the reaction environment.

The Applicant has found that the radial density of the deposited soot can be precisely controlled by opportunely varying at least one of the translation velocity of the burner and the rotation velocity of the deposition rod during the soot deposition process (i.e. as the preform diameter increases). Preferably, both said velocities are varied, while the other process parameters, such as the fuel gas flow and the soot precursors flow, are advantageously kept constant. Every variation of the translation velocity and of the rotation velocity takes place after completion of the generic deposition layer, while each layer is deposited at constant velocities to guarantee a constant axial soot density. Advantageously, the translation velocity of the burner and the rotation velocity of the deposition rod are decreased during the preform growth, eventually apart an initial part of the process where, if the deposition support is not pre-heated, said velocities are increased to stabilize the soot temperature.

The said variations of translation velocity and of rotation velocity allow to control the preform temperature during the process, and the soot density is controlled accordingly without acting on the flame temperature. In particular, it is possible to produce a glass preform with a predetermined radial density distribution avoiding any variation in the reaction environment, and. sensibly reducing risks of soot cracking or cleavage, or of bubbles generation during the consolidation stage.

Accordingly, the present invention relates to a method for producing an optical fiber preform, comprising:
forming glass soot particles by jetting and combusting a glass-forming material and a fuel gas from a burner in the presence of oxygen;
depositing the glass soot particles along the length of a deposition rod having a longitudinal axis;
rotating the deposition rod about said axis at a rotational velocity; and
reciprocating the burner relatively to the deposition rod in parallel to said axis at a translation velocity;
wherein the method further comprises varying at least one of said translation velocity and rotational velocity so as to obtain a predetermined radial density distribution in the preform. Preferably, the method comprises varying both said translation velocity and rotational velocity so as to obtain said predetermined radial density distribution in the preform.

The density of the deposited soot is preferably comprised between about 0.4 $g/cm^3$ and about 0.8 $g/cm^3$, for sensibly reducing risks of soot cracking or cleavage, or of bubbles generation during the consolidation stage.

Advantageously, varying at least one of said rotational velocity and translation velocity comprises increasing at least one of said rotational velocity and translation velocity up to a respective top value, and then decreasing at least one of said rotational velocity and translation velocity until completion of the preform.

The method may comprise preheating the deposition rod before depositing the glass soot particles. In this case, varying at least one of said rotational velocity and translation velocity preferably comprises univocally decreasing at least one of said rotational velocity and translation velocity.

Other preferred features of the method are orienting the burner in a direction perpendicular to said axis and ejecting the glass-forming material as a gas or as a vaporized liquid. Moreover, the glass-forming material preferably comprises OMCTS and the fuel gas preferably comprises methane.

BRIEF DESCRIPTION OF THE DRAWINGS

More details will become apparent from the following description, with reference to the accompanying drawings, in which.

DETAILED DESCRIPTION OF THE INVENTION

Figure 1:
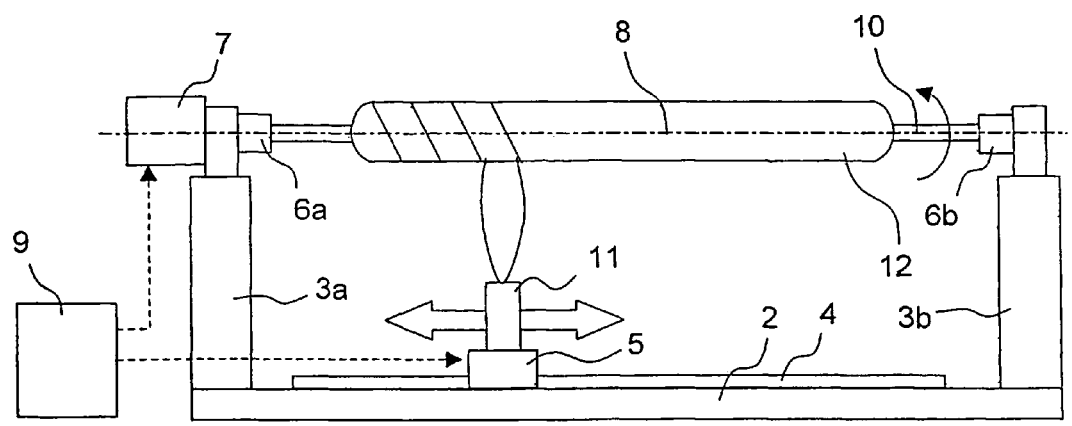
FIG. 1 is a schematic representation of the deposition stage in a OVD process.

A process for making a glass preform from optical fiber drawing is hereinbelow described. The process comprises the following stages.

In a first stage, a plurality of chemical substances is deposited on a cylindrical mandrel (which can be hold horizontally or vertically and is preferably made of alumina or other ceramic material) by means of a deposition device described hereinafter. These substances typically comprise silicium and germanium, deposited as oxides ($SiO_2$ and $GeO_2$), and they will subsequently form the core and an inner portion of the cladding of the optical fibre. The density of the chemical substances during deposition may be controlled by the method described in the following.

During the deposition process, the mandrel is made to rotate about its axis and the burner is reciprocated in parallel to the axis of the mandrel for a predetermined number of times and within a predetermined motion range, so as to grow a soot body of predetermined diameter and length.

During the soot deposition, the reactants flow may be varied so as to obtain a predetermined refraction index profile by a controlled deposition of the chemical substances.

The product of this first stage is a cylindrical preform of glass material, named "core preform", which will be formed into the core and an internal cladding region of the optical fiber.

In a second stage, the mandrel is extracted from the core preform, leaving a central hole therein.

In a third stage, the core preform is subjected to a process of drying and consolidation in a furnace, which comprises feeding $Cl_2$ and other gas into the central hole in order to eliminate the hydroxide ions (—OH) and the atoms of water contained in the preform. Thus a vitrified core preform is obtained, wherein the central hole has a lower diameter than in the initial core preform.

In a fourth stage, after vacuum has been created Inside the central hole (as described, for example, In U.S. Pat. No. 4,810,276 in the name of Corning), the vitrified core preform is placed In a vertical furnace for melting a lower end thereof. The melt of the lower end and the vacuum inside the hole cause the walls of the hole to collapse. The fused glass material then cools, forming an elongated member of predetermined diameter, which is stretched downwards by a traction device. After further cooling, the elongated member is cut to obtain a plurality of cylindrical elements, also known as "core rods". A core rod has a typical length of about one meter and a typical external diameter of about 10-20 mm.

In a fifth stage, each core rod is used as a substrate for a further process of chemical deposition ("overcladding") similar to the one of the first stage. This deposition process comprises depositing on the core rod a plurality of chemical substances (typically including $SiO_2$), which will subsequently form an external portion of the cladding of the optical fibre. This further deposition process can be carried out by using the same deposition device used for the deposition process of the first stage. The product of the fifth stage is a low-density cylindrical preform, hereinafter called "final preform".

In a sixth (and last) stage, the final preform is dried and consolidated by the same procedures as those specified for the third stage, so as to obtain a vitrified final preform, which can be subsequently drawn in a known way to obtain an optical fiber.

The final preform should have, unless otherwise required for specific applications, a soot density comprised within a predetermined range and with a substantially uniform radial distribution, so as to avoid problems of soot cracking and bubbles generation inside the preform body. The Applicant has verified that, for this purpose, a preferred range for the soot density is from about 0.4 $g/cm^3$ to about 0.8 $g/cm^3$. A method for controlling the soot density during the deposition process is hereinafter described, together with the functioning of a device suitable to perform the deposition processes previously disclosed. Although this technique is described with reference to the overcladding deposition process, which is the most to control due to the high quantity of material to be deposited, the same technique can nevertheless be applied to the deposition process of the first stage.

The chemical deposition processes previously described can be performed by means of a device 1 as shown in FIG. 1.

The device 1 basically comprises a horizontal support base 2, a couple of vertical supporting members 3a, 3b extending upwards from the base 2 at a predetermined distance to each other, a horizontal guide 4 fixed onto the base 2 and extending between the two supporting members 3a, 3b, and a motorized slide 5 coupled to the guide 4.

The supporting members 3a, 3b are provided on top with a first handling element 6a and a second handling element 6b, respectively, facing to each other and able to rotate about a same horizontal axis 8. The handling elements 6a, 6b are adapted to hold a core rod 10 (as obtained at the end of the fourth stage of the previously described process) coaxial to axis 8 and to rotate the core rod 10 about axis 8. An engine 7 is coupled the first handling element 6a for rotating the first handling element 6a and, consequently, the core rod 10 and the second handling element 6b, about axis x.

The slide 5 carries a burner 11 having gas outlets on top. The burner 11 may be for example of the type described in EP 978491 in the name of Corning. The burner 11 is adapted to eject a gaseous glass raw material and a fuel gas containing oxygen and methane (or hydrogen) towards the core rod 10, along a direction substantially perpendicular to axis 8. The glass raw material comprises a silica-precursor—typically a siloxane such as octamethylcyclotetrasiloxane (OMCTS), or a chloride such as $SiCl_4$—and, when needed (as in the first stage), a precursor of germanium oxide (such as $GeCl_4$). When the glass raw material comprises a siloxane, it generates a highly exothermic reaction providing almost all the heat of the flame. In the flame so generated, a reaction takes place producing $SiO_2$ and/or $GeO_2$, which are deposited as soot. The flame produced by the burner 11 may for example have a width of about 2.5 cm at a distance of about 15 cm. The gas flow-rates of methane and oxygen (premix) are preferably in the ranges 2,5-3,5 slpm and 2-3 slpm, respectively.

The slide 5 is adapted to move the burner 11 horizontally beneath the core rod 10 during the deposition process, so as to deposit soot on the core rod 10 while core rod 10 is rotating, thus forming a soot preform 12. The range of movement of slide 5 corresponds at least to the expected length of the preform 12, typically about 1 m. Due to the contemporary reciprocating translation of burner 11 and rotation of core rod 10, the chemical substances are deposited along a helix path.

The device 1 further comprises a control unit 9 connected to the engine 7 and to the slide 5 to control the operation thereof. Therefore, the control unit 9 can be used to control, for example according to a stored process software, the translation velocity v of the burner 11 and the rotation velocity w of the core rod 10.

During the deposition process, the translation velocity v and the rotation velocity w are varied so as to obtain the desired soot density in the preform, while the other process parameters are preferably kept constant. In particular, by controlling v and w, it is possible to control two deposition parameters that influence the deposition density: the helix formation velocity $V_e$ and the helix strip superposition $G_s$.

The helix formation velocity $V_e$ is the velocity of deposition of the chemical substances along the helix path. The helix formation velocity $V_e$ is related to v and w and to the current diameter D of the forming preform according to the following formula:

$$V_e=[(\pi Dw)^2+v^2]^{1/2} \quad (1)$$

Figure 2:
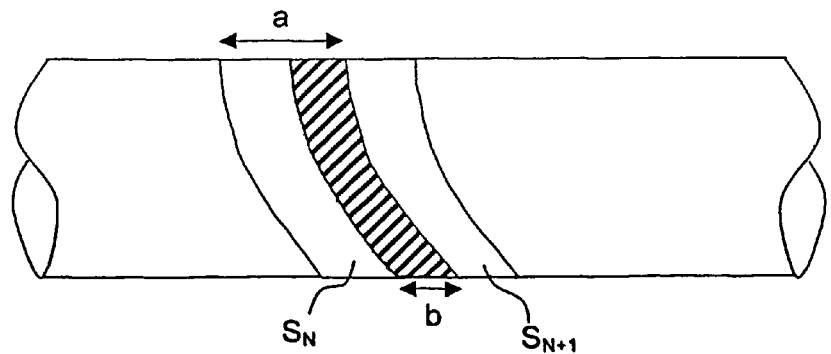
FIG. 2 schematically shows the superposition of two adjacent soot strips along the deposition helix, after a turn of the preform.

The superposition $G_s$ is the percentage of overlapping of the soot strip in two consecutive turns. FIG. 2 clarifies the meaning of this parameter. If a is the width of the strip (corresponding substantially to the width of the flame) and b is the width of the overlapping portion between the portion $S_N$ of the strip deposited at turn N and the portion $S_{N+1}$ of the strip deposited at turn N+1, $G_s$ is defined as (b/a×100). $G_s$ is related to v and w according to the following formula:

$$G_s=(1-v/wa)\cdot 100 \quad (2)$$

At the beginning of the deposition process, the velocities v and w are varied differently depending whether a preheating of the core rod is performed or not. This is because the soot density is related to the temperature of the deposition substrate, and therefore the velocities v and w shall be adjusted so as to have a substrate temperature suitable to deposit the soot at the desired density.

If pre-heating of the core rod is not performed the core rod 10 Is approximately at the room temperature at the beginning of the deposition process, i.e. at a temperature much lower than those reached during the deposition process, and the density of the deposited soot tends consequently to be low. The velocities v and w are therefore set low during the deposition of the first soot layers, to produce a rapid increase of the core rod temperature. More precisely, the deposition of the first layers is performed at velocities v and w so low that the core rod is locally warmed, in the point where it receives the soot, up to a temperature that allows soot density to be within the desired range. In particular, the Applicant has observed that, to achieve a good adhesion of the soot to the core rod 22, the soot shall be deposited in the first layers at a density preferably higher than about 0.6 g/cm³. Preferably, that density should be lower than 1 g/cm³, more preferably lower than 0.8 g/cm³, to avoid the phenomenon of bubbles generation during the following steps. Having low velocities v and w corresponds to have a relatively high superposition degree $G_s$, and a relatively low helix formation velocity $V_e$. Preferably, at this stage the translation velocity v is comprised between 540 mm/min and 680 mm/min and the rotation velocity w is comprised between 63 rpm and 78 rpm, so as to have a superposition $G_s$. comprised in the preferred range 60-70% and a helix formation velocity $V_e$ comprised in the preferred range 4000-5000 mm/min or, advantageously, in the more preferred range 4300-4500 mm/min.

Alternatively, the core rod 10 can be pre-heated before the start of the deposition process. Pre-heating can be performed for example by reciprocating the burner 11 or a supplementary burner (not shown) before starting with the soot deposition. This allows the deposition process to be started with the core rod 10 at a temperature that is preferably in the range 1000-1200° C. In this case, the velocities v and w that allow the deposition of the first soot layers at a density within the above specified ranges are higher. Preferably, such velocities are comprised between 2900 and 3100 mm/min, and between 240 and 260 rpm, respectively.

After completion of the first two or three layers, the soot is deposited on a hotter substrate, which causes the soot to be deposited at a higher density. The rapid increase of temperature can lead, in addition to a decrease in the deposition efficiency due to a reduction of the thermophoretic effect, an increase of the density over the desired range. The Applicant has found that over 0.8 g/cm³ the risk of bubbles generation is not negligible, and over 1.1 g/cm³ that risk is very high. Accordingly, after completion of a predetermined number of layers, which is preferably less of ten and more preferably between two and four, the velocities v and w are progressively increased so as to decrease the preform temperature and, consequently, the deposition density.

However, while the increase of v and w tends to stabilize the substrate temperature, the increase of the preform diameter D tends to increase the helix formation velocity $V_e$ to values that can cause an excessive decrease of the soot density. For example, if the velocities v and w were kept constant at about 2900 mm/min and 240 rpm, respectively, a preform diameter D of about 40 mm would correspond to a helix formation velocity $V_e$ greater than 30000 mm/min. Therefore, after reaching top values of v and w at the completion of a predetermined number of layers, v and w are decreased to oppose the said effect and to maintain a substantially constant preform temperature.

Preferred ranges for the top values of v and w are 2900-3100 mm/min and 240-260 rpm, respectively, i.e. the same ranges suitable for starting the deposition process when the core rod 10 is pre-heated. The corresponding preferred ranges for the helix formation velocity $V_e$ and for the superposition degree $G_s$ are 15500-16700 mm/min and 35-45%, respectively. Having $V_e$ and $G_s$ within said ranges allows to obtain a soot density of about 0.6 g/cm³.

When the preform has reached an external diameter D of about 100 mm or over, the translation velocity v is preferably lower than 2000 mm/min, more preferably lower than 1630 mm/min, and the rotation velocity w is preferably lower than 200 rpm, more preferably lower than 130 rpm. Accordingly, while the superposition degree $G_s$ is still about 40%, the helix formation velocity $V_e$ can be as high as 41000 mm/min.

The deposition process ends when the preform 12 reaches a predetermined diameter, typically about 120 mm.

Figure 3A:
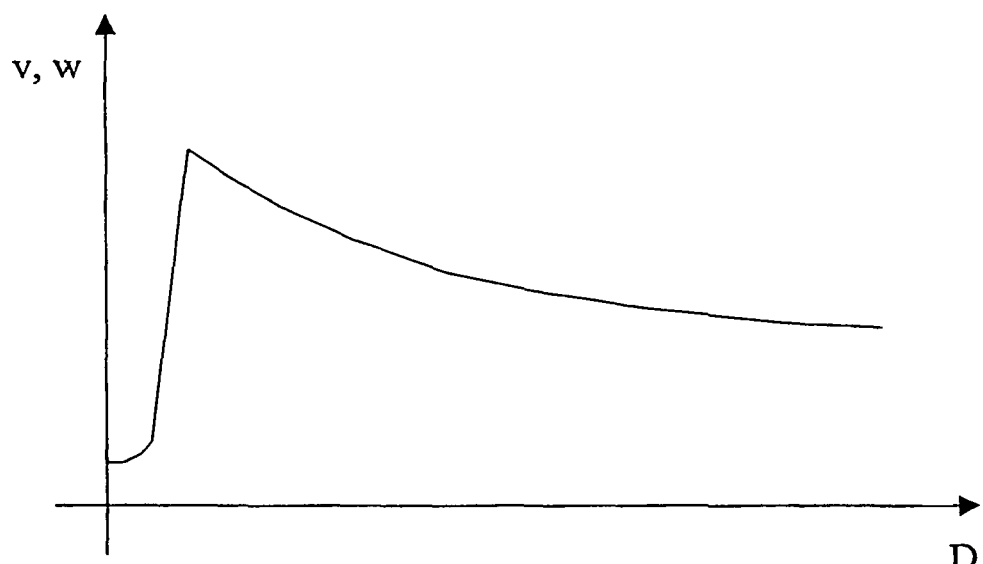
FIG. 3a and 3b are qualitative graphics showing how translation velocity and rotation velocity are varied as a function of the diameter of the growing preform, in a first case in which the deposition substrate is not pre-heated and in a second case in which the deposition substrate is preheated, respectively.
Figure 3B:
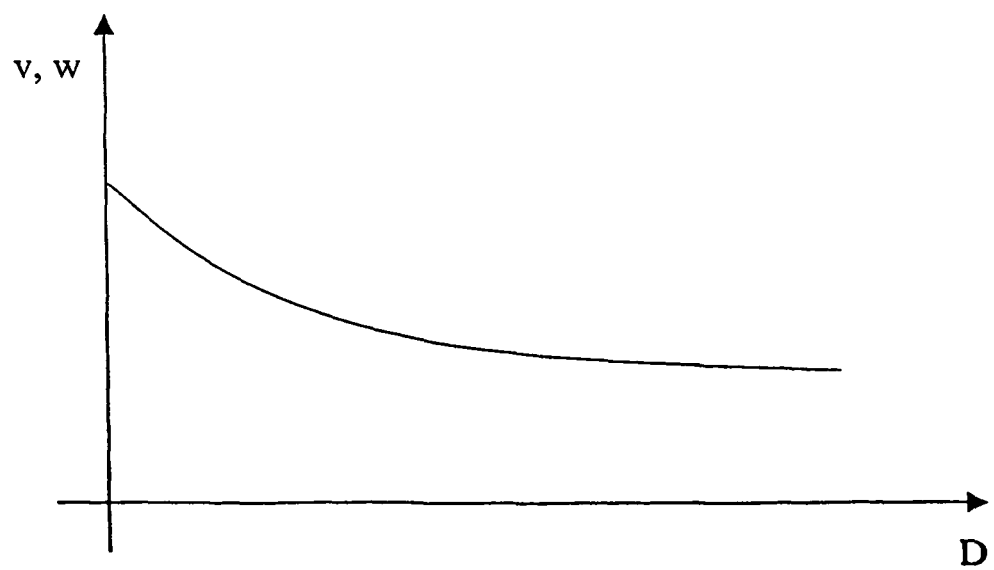

The described trends for v and w are summarized in the qualitative representation of FIGS. 3a and 3b, which refers to the deposition process without and with pre-heating, respectively. The parameters v and w are shown as a function of the preform diameter D. In the curve of FIG. 3a, v and w start with low values, are increased up to respective top values, and then are decreased until the completion of the preform 12, in accordance with the process described above. In the curve of FIG. 3b, the velocities v and w are decreased from the beginning, starting from predetermined top values.

Although the control of the soot deposition density is preferably performed by varying both v and w, such density could also be controlled by opportunely varying the sole velocity v or the sole velocity w and keeping the other velocity substantially constant. In this case, the velocity v or the velocity w should be varied so as to opportunely control the temperature preform during the process. This can be done by varying the velocity v or the velocity w so as to obtain values of the helix formation velocity $V_e$ and of the helix strips superposition $G_s$ within the preferred ranges indicated above.

EXAMPLE 1

The precursor compound was OMCTS. The diameter of the core rod 10 was 2 cm. The precursor flow rate was such as to generate 10 g/min of $SiO_2$. The flow rate of the combustion gas $CH_4$ was 2.5 slpm. The translation velocity v and the rotation velocity w were held constant, respectively at 500 mm/min and 70 turns/min. The total deposition time was 3 hours. In this way, a deposition rate of about 4.8 g/min and an average density of about 1.3 g/cm³ were obtained.

EXAMPLE 2

The type of precursor, the diameter of the core rod 10, the precursor flow rate and the combustion gas flow rate were as in example 1. A pre-heating of the core rod 10 was performed and the velocities v and w were varied in accordance with the trend of FIG. 3b, by way of respective ramp functions. The respective initial values of v and w were 3000 mm/min and 260 turns/min and the respective final values were 2500 mm/min and 200 turns/min. In this way, a deposition rate of about 4.8 g/min and an average density of about 0.7 g/cm³ were obtained.

The results of Example 1 and Example 2 show that, by varying the velocities v and w in a controlled manner, it is possible to maintain the soot density within a predetermined range, which is preferably between 0.4 and 0.8 g/cm³, wherein the said cracking, deavage or bubble generation problems are prevented.

Finally, it is evident that other modifications, variations, replacements and additions may be carried out on the embodiments described above without thereby departing from the scope of the present invention.

For example, although the process has been described only with reference to a substantially uniform soot radial distribution (i.e. a soot density within the specified range), the technique of the invention may be applied for obtaining a soot density distribution with predetermined variations. In general, the process of the invention comprises varying in a controlled manner at least one of the rotational velocity w and the translation velocity v (preferably both) so as to obtain a predetermined variation of the preform temperature during the deposition process and, consequently, a predetermined radial soot density distribution in the preform. In fact, a predetermined radial soot density distribution can be obtained by controlling the velocities v and w as previously described, or by controlling only the translation velocity or only the rotation velocity, provided the variations of v and w are such as to have predetermined variations of the quantities $G_s$ and $V_e$.

Alternatively to the horizontal deposition process described above, the OVD process may be carried on vertically, i.e. by holding the core rod 10 in a vertical position and moving the burner 11 along a vertical direction.

In another embodiment, the burner 11 may be in a fixed position and the core rod 10 be translated along its axis. A reciprocating movement of the core rod 10 with respect to the burner 11 shall be provided in this case, with a velocity variable as described above for the velocity v.

Finally, the burner 11 may be of a type adapted to eject the precursors of silicium oxide and germanium oxide in the form of vaporized liquid, instead of in the form of gas.

What is claimed is:

1. A method for producing an optical fiber preform, comprising:
   forming glass soot particles by jetting and combusting a glass-forming material and a fuel gas from a burner in the presence of oxygen;
   depositing in a plurality. of deposition passes. a plurality of deposition layers comprised of said glass soot particles on a deposition rod having a longitudinal axis, each of said plurality of deposition layers being deposited by rotating said deposition rod about said longitudinal axis at a rotational velocity while translating said burner relative to said deposition rod in parallel to said longitudinal axis at a translation velocity; and
   providing said preform with a density distribution that is substantially uniform in a radial direction such that each of said plurality of deposition layers has a density between about 0.4 g/cm³ and about 1.0 g/cm³, by varying at least one of said translation velocity and said rotational velocity, said varying at least one of said translation velocity and said rotational velocity occurring only between deposition passes,
   wherein the same translation velocity is used throughout deposition of each of the plurality of deposition layers.

2. A method for producing an optical fiber preform, comprising:
   forming glass soot particles by jetting and combusting a glass-forming material and a fuel gas from a burner in the presence of oxygen;
   depositing the glass soot particles on the deposition rod;
   depositing, in a plurality of deposition passes, a plurality of deposition layers comprised of said glass soot particles on a deposition rod having a longitudinal axis, each of said plurality of deposition layers being deposited by rotating said deposition rod about said longitudinal axis at a rotational velocity while translating said burner relative to said deposition rod in parallel to said longitudinal axis at a translation velocity; and
   providing said preform with a density distribution that is substantially uniform in a radial direction, such that each of said plurality of deposition layers has a density between about 0.4 g/cm³ and about 1.0 g/cm³, by progressively increasing at least one of said translation velocity and said rotational velocity to a respective top value, said progressive increasing occurring only between deposition passes, and, thereafter, progressively decreasing said at least one of said translation velocity and said rotational velocity as a diameter of said preform grows with said depositing of said plurality of deposition layers, said progressive decreasing occurring only between deposition passes.

3. A method according to claim 2, comprising increasing both of said translation velocity and rotational velocity to a respective top value.

4. A method according to claim 2, comprising, after increasing at least one of said translation velocity and said rotational velocity to a respective top value, decreasing both of said translation velocity and rotational velocity so as to provide the preform with a density distribution that is substantially uniform in the radial direction.

5. A method according to claim 2, comprising increasing at least one of said translation velocity and said rotational velocity to a respective top value between depositing of deposition layers and, thereafter, decreasing at least one of said translation velocity and said rotational velocity between deposition passes so as to provide the preform with a density between about 0.4 g/cm³ and below about 1.0 g/cm³ in the radial direction in each of the plurality of deposition layers.

* * * * *